United States Patent
Michel

(10) Patent No.: US 7,010,898 B2
(45) Date of Patent: Mar. 14, 2006

(54) TOOL WITH A SENSOR CHIP

(75) Inventor: Frank Michel, Steffenberg (DE)

(73) Assignee: Convenience Food Systems Wallau GmbH & Co. KG, Wallau (DE)

( * ) Notice: Subject to any disclaimer, the term of this patent is extended or adjusted under 35 U.S.C. 154(b) by 0 days.

(21) Appl. No.: 10/481,355

(22) PCT Filed: Jun. 19, 2002

(86) PCT No.: PCT/EP02/06781

§ 371 (c)(1),
(2), (4) Date: May 24, 2004

(87) PCT Pub. No.: WO03/000481

PCT Pub. Date: Jan. 3, 2003

(65) Prior Publication Data
US 2004/0187443 A1   Sep. 30, 2004

(30) Foreign Application Priority Data
Jun. 20, 2001   (DE) ................. 101 29 392

(51) Int. Cl.
B65B 19/28   (2006.01)
(52) U.S. Cl. .......................... 53/52; 53/559
(58) Field of Classification Search ............... 53/561, 53/453, 52; 493/34; 425/150, 169
See application file for complete search history.

(56) References Cited

U.S. PATENT DOCUMENTS

| | | | | |
|---|---|---|---|---|
| 4,014,275 A | * | 3/1977 | Herr et al. | 112/457 |
| 4,588,339 A | * | 5/1986 | Bilz | 409/234 |
| 4,720,907 A | * | 1/1988 | Rapp | 235/439 |
| 4,742,470 A | * | 5/1988 | Juengel | 700/175 |
| 4,809,426 A | * | 3/1989 | Takeuchi et al. | 365/64 |
| 4,850,766 A | * | 7/1989 | Furuhashi et al. | 409/234 |
| 4,927,299 A | * | 5/1990 | Ramalingam et al. | 407/120 |
| 5,113,756 A | * | 5/1992 | Fujii | 100/48 |
| 5,269,163 A | * | 12/1993 | Yagi et al. | 72/20.1 |
| 5,310,369 A | * | 5/1994 | Kobayashi | 440/38 |
| 5,571,539 A | | 11/1996 | Starkey | 425/135 |
| 5,997,271 A | * | 12/1999 | Taubmann et al. | 425/169 |
| 6,047,579 A | | 4/2000 | Schmitz | 72/15.1 |
| 6,254,375 B1 | * | 7/2001 | Thomas et al. | 425/403 |
| 6,344,018 B1 | * | 2/2002 | Aizawa | 483/29 |
| 6,585,628 B1 | * | 7/2003 | Tsung et al. | 483/9 |

FOREIGN PATENT DOCUMENTS

| | | |
|---|---|---|
| DE | 199 25 458 | 12/2000 |
| EP | 1 057 586 | 5/2000 |
| EP | 1 084 806 | 9/2000 |

OTHER PUBLICATIONS

Patent Abstracts of Japan, Publication No. 2000281361, Date Oct. 10, 2000, European Patent Office.
Patent Abstracts of Japan, Publication No. 07161745, European Patent Office.
Patent Abstracts of Japan, Publication No. 61252114, European Patent Office.

* cited by examiner

Primary Examiner—Stephen F. Gerrity
Assistant Examiner—Hemant M. Desai
(74) Attorney, Agent, or Firm—Perman & Green, LLP

(57) ABSTRACT

The invention relates to a tool, especially in a packaging machine, for closing cavities in packaging and/or sealing and cutting packaging. The tool is raised and lowered by a lifting device. The invention also relates to a packaging machine comprising the tool and to a method for automatically adjusting the parameters of a packaging machine.

9 Claims, 3 Drawing Sheets

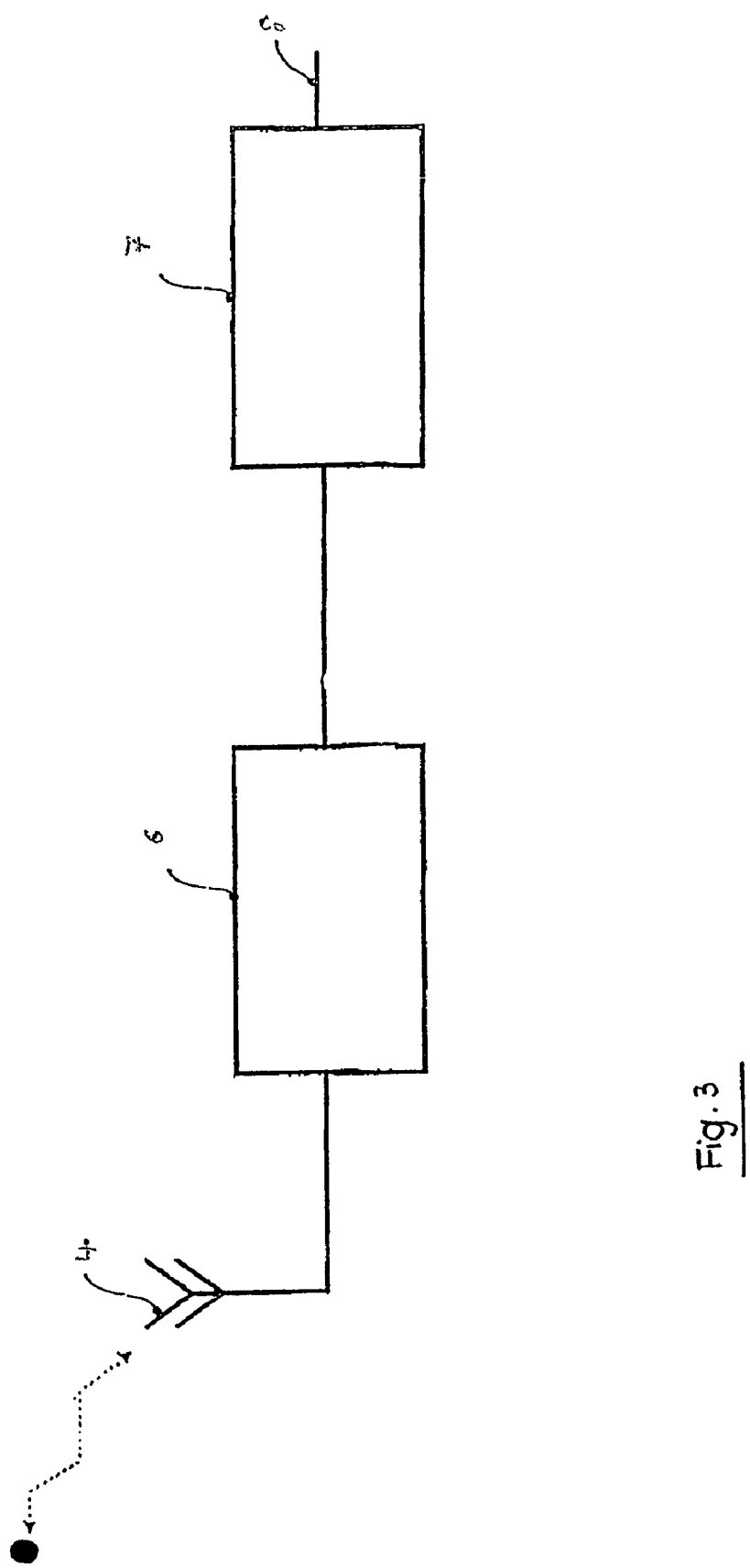

TOOL WITH A SENSOR CHIP

This application claims the benefit of the earlier filed International Application No. PCT/EP02/06781, International Filing Date, Jun. 19, 2002, which designated the United States of America, and which international application was published under PCT Article 21(2) as WO Publication No. WO 03/000481 A1.

BACKGROUND OF THE INVENTION

The present invention relates to a tool, especially in a packaging machine, for deep-drawing of packaging cavities and/or sealing and cutting packaging whereby the tool is raised and lowered by a lifting device. The present invention further relates to a packaging machine comprising said tool and a method for automatically adjusting the parameters of a packaging machine.

Nowadays, packaging machines may be operated with a plurality of tools. When these tools are changed, the machine parameters, such as, for example, the top and bottom dead point of the lifting devices in the packaging devices, and also the cooling and/or sealing temperatures have to be reset. Since this is very laborious, in the past it was attempted to standardise said tools, for example in their overall height, in order to minimise the amount of adjustment. However, then said tools are not optimally designed for the application in question.

Therefore, this invention is based on the object of providing tools especially for packaging machines that do not have the drawbacks of the prior art.

SUMMARY OF THE INVENTION

This task is resolved by a tool, especially in a packaging machine for deep-drawing cavities in packaging and/or sealing and cutting packaging, in which said tool is raised and lowered by a lifting device, whereby a sensor chip is integrated in the tool, the sensor comprising a write/read data memory on which are stored data which identify the tool and/or contain setpoint values for the automatic adjustment of adjustable machine parameters.

According to the invention, the tool comprises a write/read data memory on which data are stored. These data may be on the one hand data such as, for example, a sequence of digits enabling the unambiguous identification of the tool so that an electronic device, for example a computer or a process control system, arranged in the packaging machine identifies the tool unambiguously and then assigns specific machine parameters to this tool and automatically adjusts them as appropriate.

Also according to the invention, the data memory comprises the setpoint values for the automatic adjustment of the machine parameters. An electronic device, for example a computer or a process control system, reads these machine parameters from the data memory and automatically adjusts them as appropriate.

These machine parameters may be, for example, the top and bottom dead point of the lifting device with which the tool in question is lifted or lowered, the temperature to which the tool is heated or cooled and the contact pressure with which the tool is pressed against another tool.

Preferably, the data memory comprises setpoint values for the top and, particularly preferably, also for the bottom dead point of the lifting device.

In another preferred embodiment, the data memory contains identification data enabling the unambiguous correlation and adjustment of the top and preferably the bottom dead point of the lifting device. The correlation data are preferably stored in a computer or a process control system which is connected to the sensor chip.

These two preferred embodiments of the tool according to the invention have the advantage that the tool may be adjusted to the optimum height. The differing height is then automatically compensated by the adjustment of the top and bottom dead point of the lifting device. The tool according to the invention avoids long change-over times and in particular errors in the adjustment of machine parameters that could result in damage to the packaging machine and/or defective products.

A further object of the invention is a tool, in particular in a packaging machine, whereby installed in the tool there is a sensor chip comprising a write/read data memory in which data are stored which are used as actual values for comparison with the data in a second data memory assigned to the packaging machine whose data matched to the tool serve as setpoint values for a comparison of the actual and setpoint values and the control of the packaging machine is designed so the machine cannot be put into operation if the actual values deviate from the setpoint values.

In the case of the tool according to the invention, first of all, it is guaranteed that it cannot be replaced by a tool not intended for the packaging machine in question because in such a case, the comparison of the actual and setpoint values will fail and it will be impossible to start the packaging machine. This also applies if a non-matching tool made by the same manufacturer or a tool made by a different manufacturer is installed; in both cases the operator will be made aware of the error and the malfunction of the machine reliably avoided.

In addition, it is now possible that even with packaging machines of the type in which, in addition to the tool, an associated mating component, for example the punch in the case of deep-drawing and/or the top tool in the case of sealing, are replaceable, it may be guaranteed that the only pairing possible is that with which the individual tools match each other. If this is not the case, once again the controls of the packaging machine prevent it from being started.

It is particularly advantageous with the aforementioned objects of the invention if the sensor chip on the tool is provided in an enclosed hollow so that unauthorised people are unable to find it or manipulate it. Advantageously, the chip is countersunk in the hollow in such a way that if it is discovered by chance, the data memory will be disabled upon removal and the sensor chip damaged. Also preferably, the sensor chip is attached to a tool, preferably detachably.

The tools according to the invention may be any tools that may be replaced on a machine, in particular a packaging machine. However, preferably the tools are deep-drawing, sealing or cutting tools.

The best way to read the data from the data memories integrated in the tools in a packaging machine is if the sensor chip is coupled by bi-directional and wireless means to a transmitting and receiving system which is arranged on the packaging machine or is mobile. Another object of the invention is therefore a packaging machine of this type.

Preferably, the transmitting and receiving system is connected via an amplifier to a second data memory and/or an electronic machine control, for example a process control system, so that the data set of the tool may be made readable and the data used either to start the packaging machine or for the automatic adjustment of machine parameters. The transmitting and receiving system is particularly advantageously provided in the immediate vicinity of the tool in question.

Advantageously, the transmitting and receiving system may also be mobile.

The packaging machine according to the invention has the advantage that the change-over times are minimal, that no errors can occur during the adjustment of the process parameters, and that it is impossible to use tool pairs that do not match.

Another object of the invention is a method for the automatic adjustment of machine parameters when using the packaging machine according to the invention in which, at least during the change-over of the packaging machine, the data in the data memory of at least one tool are read and then the electronic control automatically adjusts the adjustable machine parameters in accordance with the identification of the tool and/or the stored setpoint values.

In an advantageous embodiment of the invention, the adjustment of the machine parameters is checked at least once by means of a comparison of the actual and setpoint values. Particular preferably, however, the adjustment will be checked at regular intervals in order in particular to ensure a consistent quality of the products made.

Preferably, all machine parameters which have to be adjusted on a tool change are automatically adjusted by the electronics of the packaging machine. However, particularly preferably at least the top and bottom dead point of the lifting device are automatically adapted to the tool.

The invention will now be further described with reference to FIGS. 1 to 3. These explanations are examples only and do not restrict the general concept of the invention.

DESCRIPTION OF THE DRAWING

FIG. 3 is the receiving and amplifying system.

DETAILED DESCRIPTION OF THE INVENTION

Figure 1:
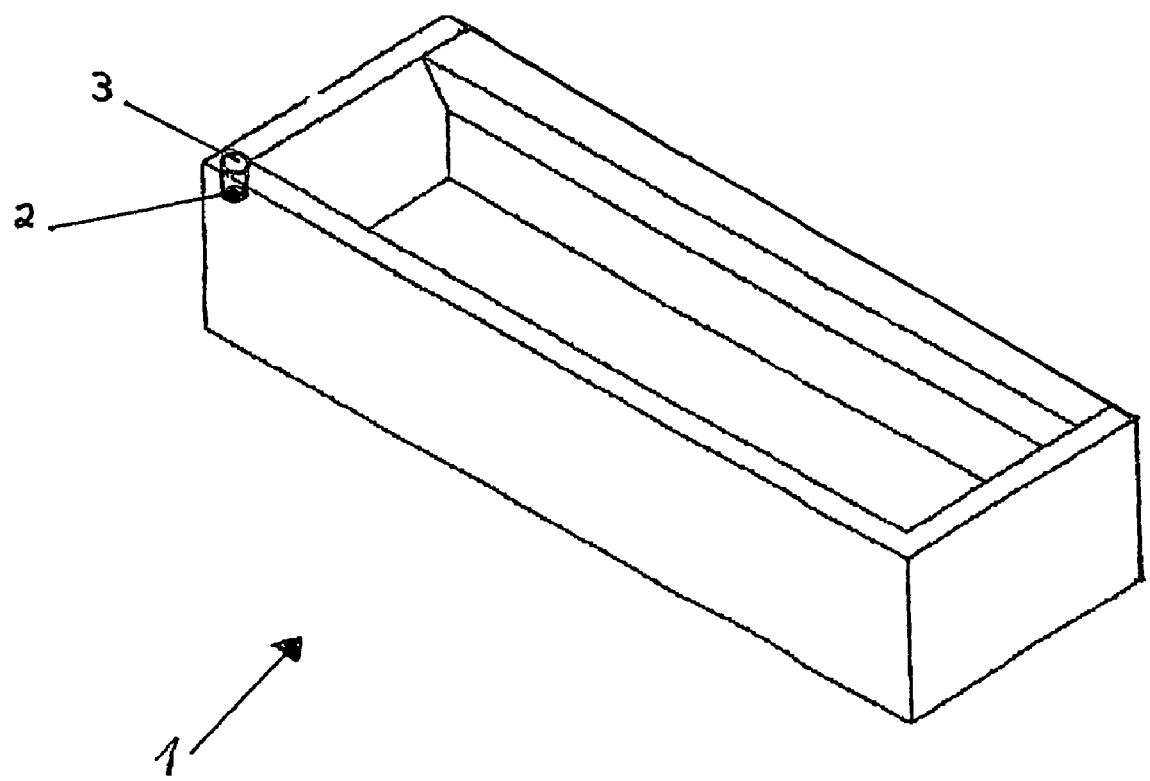
FIG. 1 is a tool according to the invention.

FIG. 1 shows the tool 1 according to the invention. In this example, the tool is a deep-drawing matrix. A person skilled in the art will recognise that the tool according to the invention could just as well be a sealing tool, a cutting tool or similar. A hollow 3 is provided in the tool 1 in which the sensor chip 2 is located. The hollow is sealed so that the chip is not visible from the exterior and the chip is not exposed to any mechanical stresses.

Figure 2:
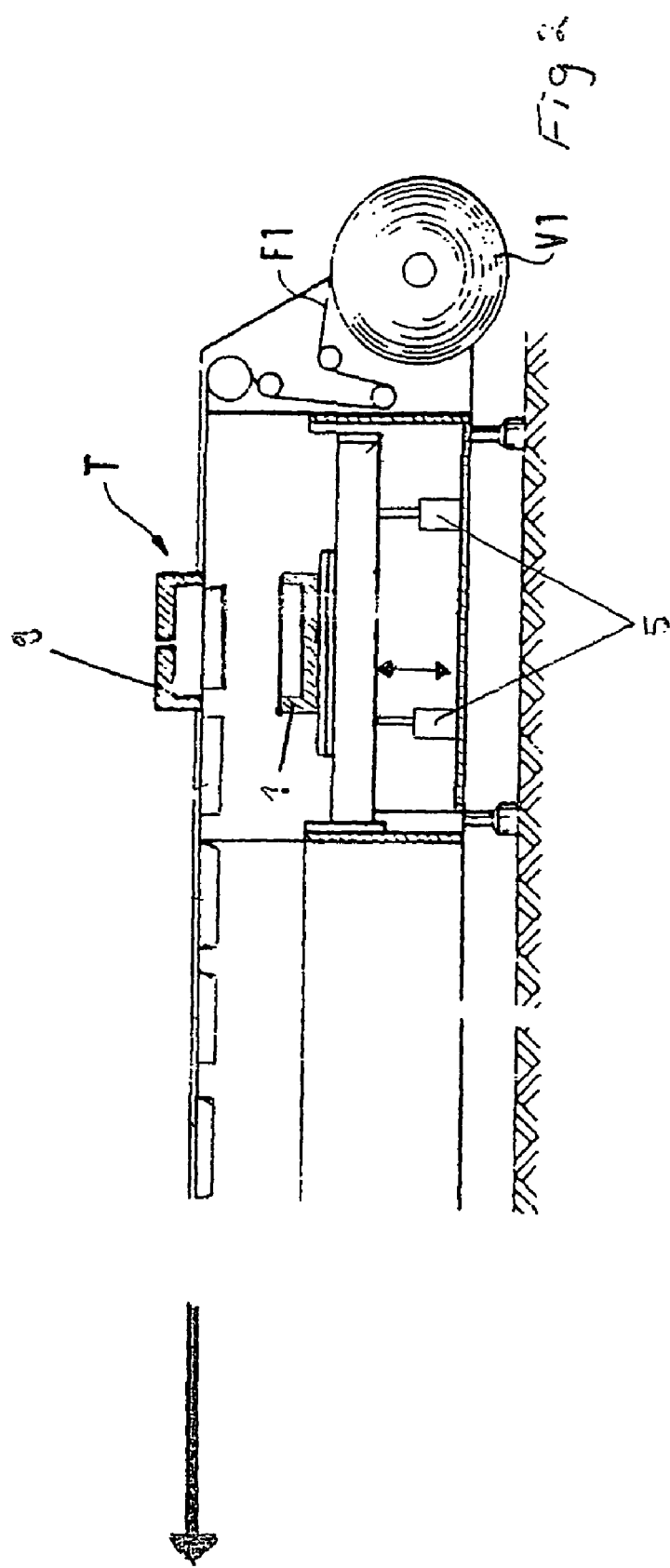
FIG. 2 is the packaging machine according to the invention.

FIG. 2 shows a part of a packaging machine according to the invention, the deep-drawing station. The film F1 is rolled off a roll V1 and transported, for example by a chain drive, to the deep-drawing station T. There, the film is fixed and heated with heating elements 9 whereby the heating of the film may also take place before the deep-drawing station. The tool 1 according to the invention is located on a lifting device 5 with which it is raised and lowered. As soon as the tool 1 is fixed to the lifting device, a transmitting and receiving system reads the data on the sensor chip 2 located in the tool 1. These data are then processed with a computer and this computer then controls the automatic adjustment of the machine parameters, such as, for example, the top and bottom dead points of the lifting device. The top and bottom dead points should be understood to mean the top or bottom maximum lifting setting.

FIG. 3 is a schematic diagram of a device for data acquisition and processing according to the invention. The transmitting and receiving system 4 is connected bi-directionally via an amplifier 6 to a computer 7 also bi-directionally. This computer 7 processes the received data and forwards them via an interface 8 to the control electronics of the packaging machine which adjust the machine parameters and report these adjustments back to the computer 7. The computer determines by means of a comparison of the actual and setpoint values whether the adjustments are correct and only then releases the machine. The check whether the tool used matches the packaging machine and/or the mating components is performed in a similar way.

What is claimed is:

1. Packaging machine with at least one tool for deep-drawing packaging cavities and/or sealing and cutting packaging, whereby the tool is raised and lowered by a lifting device;

characterised in that a sensor chip is integrated in the tool, the sensor chip comprising a write/read data memory in which data are stored which are contain setpoint values for the automatic adjustment of adjustable machine parameters, and the sensor chip is coupled by bi-directional and wireless means to a transmitting and receiving system which is arranged on the exterior of the packaging machine or is mobile; and further characterised in that the set point data stored in the read/write data memory chip are used as actual values for comparison with the set point data stored in a second data memory of the packaging machine, wherein the packaging machine set point data are matched to the tool set point data for a comparison of the actual and machine setpoint values, and further wherein the packaging machine is controlled so that said machine cannot be put into operation if the actual values deviate from the machine setpoint values.

2. Packaging machine according to claim 1, wherein the setpoint value stored is top and bottom dead point of the lifting device.

3. Packaging machine according to claim 1, wherein the identification in the data memory may be used to correlate the top and the bottom dead point of the lifting device.

4. Packaging machine according to claim 1, wherein the sensor chip is provided in a sealed hollow or attached to the exterior of the tool.

5. Packaging machine according to claim 4, wherein an electronic control automatically sets specific machine parameters on the basis of the identification of the tool.

6. Packaging machine according to claim 1, wherein said tool is a deepdrawing, sealing or cutting tool.

7. Packaging machine according to claim 1, wherein the transmitting and receiving system is connected via an amplifier to the second data memory and/or an electronic machine control.

8. Packaging machine according to claim 1, wherein said packaging machine may only be put into operation if the actual values match the setpoint values.

9. A packaging machine comprising at least one tool being used for deep-drawing packaging cavities and/or sealing and cutting packaging, said tool is raised and lowered by a lifting device;

a sensor chip is integrated in the tool, the sensor chip comprising a write/read data memory in which data are stored, said data contain set point values for automatic adjustment of adjustable machine parameters, and the sensor chip is coupled by bi-directional and wireless means to a transmitting and receiving system, said transmitting and receiving system arranged on the exterior of the packaging machine or is mobile; and further the packaging machine comprises a second data memory, said second data memory contains machine set point values, wherein the set point values stored in the read/write data memory of the tool are used as actual values for comparison with the set point values stored in the second data memory of packaging machine, wherein the packaging machine set point values are matched to the tool set point values for a comparison of the actual and machine setpoint values; and further, the sensor chip is mounted within an enclosed hollow in the tool.

* * * * *